United States Patent [19]

Wied et al.

[11] 4,182,543

[45] Jan. 8, 1980

[54] RUGGEDIZED ACOUSTO-OPTIC WAVEGUIDE

[75] Inventors: Dennis N. Wied, Melbourne; Robert M. Montgomery, Indialantic, both of Fla.

[73] Assignee: Harris Corporation, Cleveland, Ohio

[21] Appl. No.: 825,986

[22] Filed: Aug. 19, 1977

[51] Int. Cl.² .................................................. G02B 5/14
[52] U.S. Cl. .................................... 350/96.13; 350/358
[58] Field of Search ............................... 350/96.13, 358

[56] References Cited

U.S. PATENT DOCUMENTS

| | | | |
|---|---|---|---|
| 3,655,261 | 4/1972 | Chang | 350/96.13 |
| 3,675,157 | 7/1972 | Kaminow et al. | 350/358 |
| 3,856,378 | 12/1974 | Brandt et al. | 350/96.13 |

OTHER PUBLICATIONS

Kino et al., "Signal Processing in Acoustic Surface-Wave Devices" *IEEE Spectrum* vol. 8, No. 8, Aug. 1971, pp. 22–35.

*Primary Examiner*—Stewart J. Levy
*Attorney, Agent, or Firm*—Craig and Antonelli

[57] ABSTRACT

A ruggedized acousto-optic waveguide comprising a pair of inner plastic plates, a sheet of optical glass sandwiched flush between the inner plates with side edges exposed to ambient light, a transducer acoustically coupled with one end of the sheet of glass, a resilient pad overlaying one of the inner plates, a pair of cover plates mounted about and in compressive engagement with the pair of inner plates and resilient pad, and a set of compression springs coupled with the other end of the sheet of glass applying in-plane compression thereto.

19 Claims, 4 Drawing Figures

RUGGEDIZED ACOUSTO-OPTIC WAVEGUIDE

BACKGROUND OF THE INVENTION

This invention relates generally to acousto-optic waveguides, and particularly to acousto-optic waveguides of the type employing a thin sheet of optical glass.

In accordance with the Bragg Defraction Theory, a spatially-coherent, substantially monochromic light beam incident upon sound waves at a particular angle, which angle is dependent upon the wavelength of the light and sound, is deflected by the sound waves at this same angle. Thus when light and sound interact at the Bragg angle, the traveling sound waves act as if they were moving mirrors. By altering the frequency of sound wave propagation, a beam of coherent light incident upon the traveling sound waves may itself be deflected.

Today there exist several types of acousto-optic devices which utilize the just described light and sound interaction phenomenon. Among these are acousto-optic beam deflectors and traveling lens devices. Each of these types of devices employ a waveguide in which light and sound interaction occurs. In some cases the waveguide may be fairly large and employ an optically clear liquid such as water housed within a transparent casing. In other cases however the waveguide should be very thin such as in the order as several tens of mils thickness for effective device operation. Waveguides of this order of thickness cannot practically be produced to encase liquids. Thus these types are ordinarily composed of an optically clear, solid sheet of glass.

Heretofore, thin glass type acousto-optic waveguides have met with only limited success due to their low power handling capabilities. Being brittle and of thin configuration, their tensile strength is quite low. Even when held firmly in position along a plane, they have tended to fracture or to shatter completely whenever an acoustic wave is impressed thereon having an amplitude in excess of the waveguide tensile strength.

Accordingly it is a general object of the present invention to provide a ruggedized acousto-optic waveguide.

More specifically, it is an object of the invention to provide a ruggedized acoustic-optic waveguide of the type comprised of a thin sheet of optically clear glass.

Another object of the invention is to provide a ruggedized acoustic-optic waveguide of the type described which is capable of guiding relatively high power acoustic waves for a given waveguide size.

Yet another object of the invention is to provide a ruggedized acoustic-optic waveguide of the type described with means for adjusting the power handling capability of the waveguide.

Still another object of the invention is to provide a ruggedized acoustic-optic waveguide of the type described which is relatively simple to construct and adjust.

SUMMARY OF THE INVENTION

In one form of the invention a ruggedized acousto-optic waveguide is provided comprising a sheet of glass positioned along a plane, means for applying in-plane compressive force to the sheet of glass, and means for inhibiting the sheet of glass from buckling from the plane.

In another form of the invention a ruggedized acousto-optic waveguide is provided comprising a pair of inner plates, a sheet of glass sandwiched flush between the inner plates, and transducer means acoustically coupled with the sheet of glass for generating and propagating acoustic waves through the glass along an acoustic wavepath. Means are also provided for pressing the pair of inner plates against the sheet of glass to place the glass in compression transverse to the acoustic wavepath and for compressing the glass in the direction of the acoustic wavepath.

In another form of the invention a method is provided for ruggedizing an acousto-optic waveguide of the type employing a thin sheet of optical glass in which a beam of light may be directionally controlled by acoustic waves traversing the sheet of glass in a preselected direction. The method comprises the steps of applying a compressive force to the sheet of glass in the preselected direction while applying compressive force to the sheet of glass in a direction normal to the preselected direction.

DESCRIPTION OF THE PREFERRED EMBODIMENT

Figure 1:
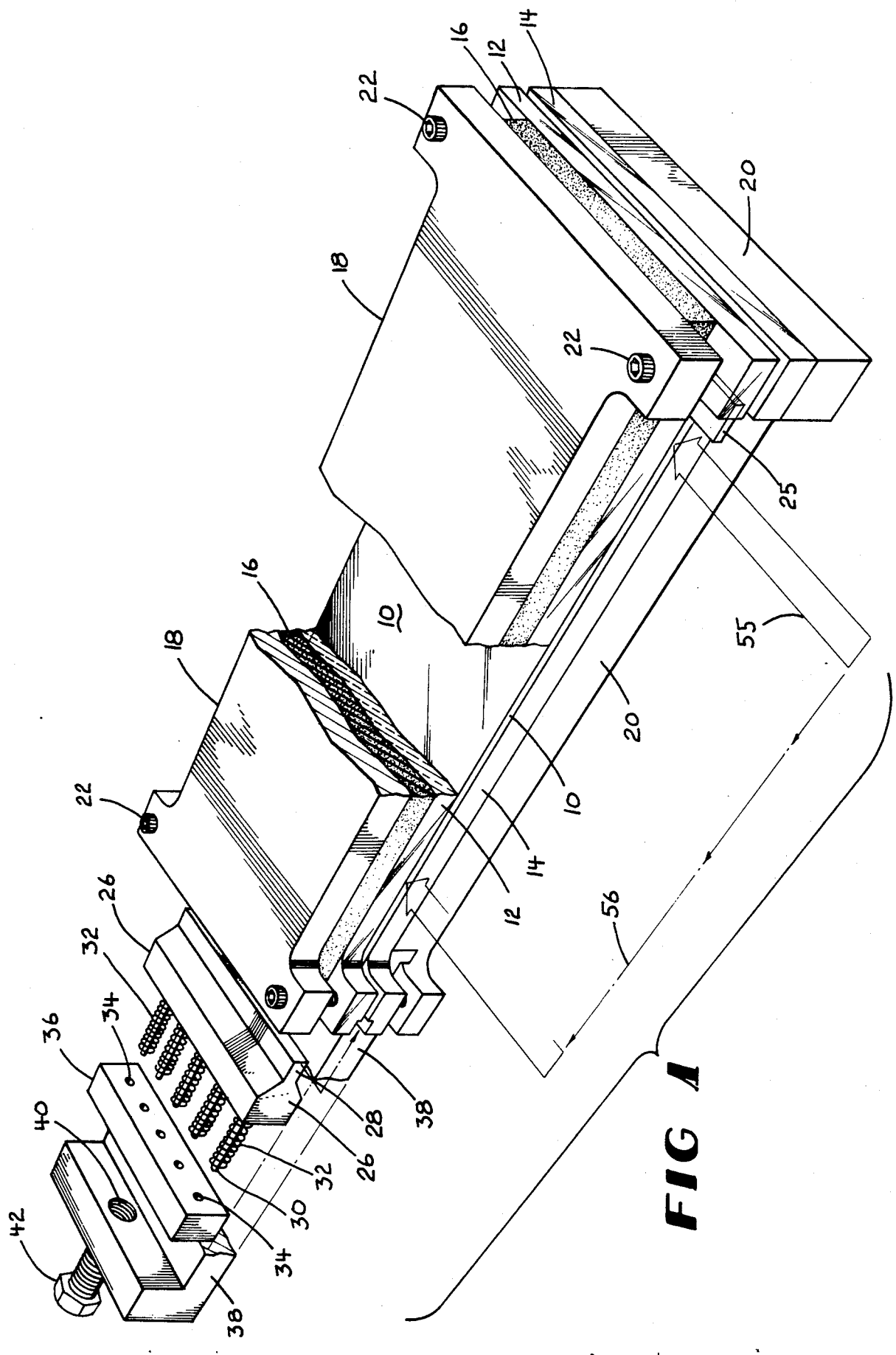
FIG. 1 is a perspective view of a ruggedized acousto-optic waveguide embodying principles of the invention in one preferred form.
Figure 2:
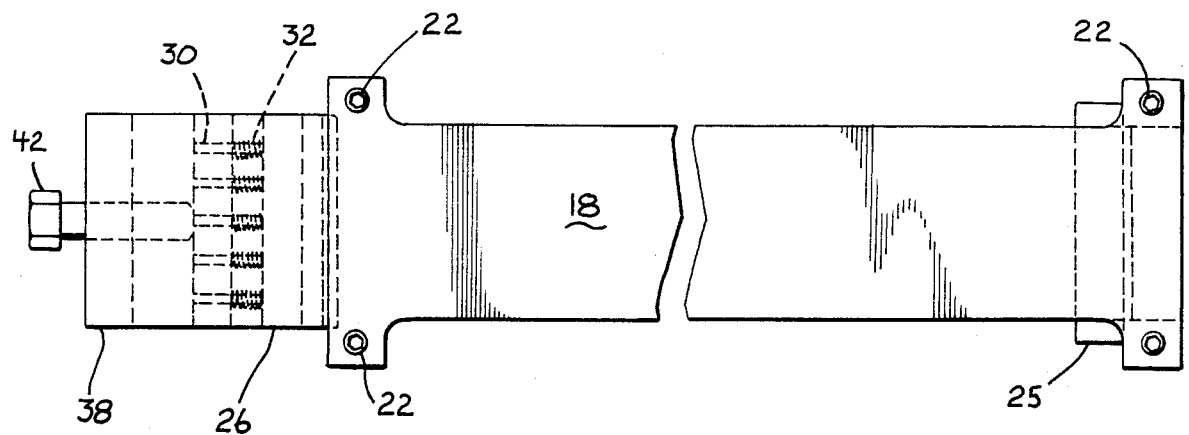
FIG. 2 is a plan view of the ruggedized acousto-optic waveguide illustrated in FIG. 1.
Figure 3:
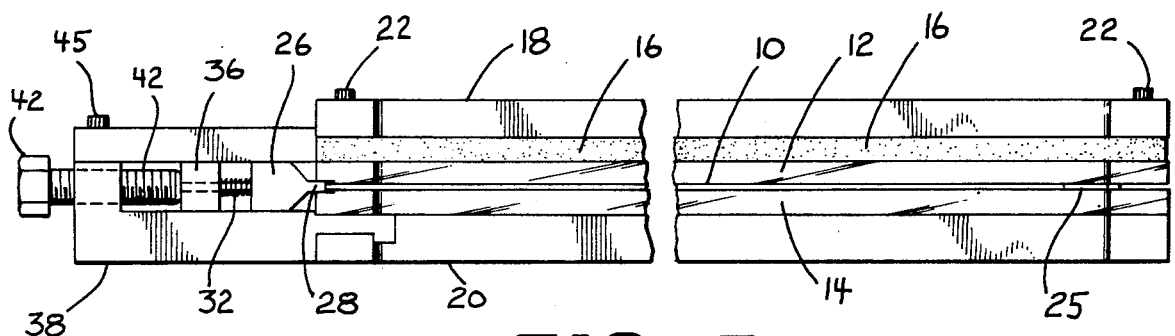
FIG. 3 is a side elevational view of the ruggedized acousto-optic waveguide shown in FIGS. 1 and 2.

With reference now in more detail to the drawing, there is shown in FIGS. 1-3 an acousto-optic waveguide comprising a flat sheet or wafer of glass 10 positioned along a plane. The sheet of glass here is very thin such as in the order of some 10 to 70 mils thick. This glass is optically clear meaning that it has good clarity with few if any nicks or inclusions, and is unstressed. One commercially available glass meeting these requirements is Type SF59 sold by Schott Optical Glass Company of Duryea, Pennsylvania.

The sheet of glass is seen to be sandwiched flush against and in intimate contact with an inner pair of upper and lower plates 12 and 14. These plates are of moderate hardness, less than that of the glass wafer, and have an acoustic impedance differing from that of the sheet of glass. A group of materials meeting these specifications is plastic included within which is polymethyl methacrylate or Plexiglas and Lucite. Alternatively, a hard rubber such as Neoprene may be used. The acoustic impedance of each plate should be different from that of the glass in order to assure good energy reflection of acoustic waves traveling within the glass off of the plates in guiding acoustic energy longitudinally through the waveguide. With the plates being softer than the glass any burrs will fold when pressed against the glass rather than create an air gap. They should not however be so soft as to have significant structural flexibility.

The upper plate 12 here is seen to be overlaid with a resilient pad 16 composed in this case of foam rubber. Pad 16 has local resilience which serves to equalize compressive forces applied along the sheet of glass. If desired, other structures could be substituted for the foam rubber to provide this function such as various shapes of springs and spring sets. In addition, a second resilient pad may be employed beneath the lower inner plate 14.

To complete the laminate structure upper and lower cover plates 18 and 20 are provided respectively above the resilient pad 16 and below the lower plate 14. These cover plates are preferably of soft, stiff metal or metal alloy such as aluminum 6061-T6 and remain flat to within one mil in ten inches during waveguide operations. They are held together by a set of threaded screws 22. By tightening these screws the two cover plates may be forced together thereby applying a compressive force to the glass 10 in a direction normal to its plane. This action causes plates 12 and 14 to obtain a flat, flush grip upon the glass thereby causing any flaws to fold back. This also places the glass in compression thereby inhibiting it from buckling off of its plane during operation when acoustic waves propagate therethrough.

In abutment with one end of the sheet of glass 10 is an aluminum end piece 25 sandwiched flush between inner plates 12 and 14. An unshown piezoelectric transducer is bonded to this end piece for generating and propagating acoustic waves longitudinally through the glass sheet. On the opposite end of the glass sheet is mounted apparatus for applying in-plane compressive force thereto. This apparatus is seen to include a push bar 26 having a tapered projection 28 slidably disposed between inner plates 12 and 14 in either direct abutment with the end of the sheet of glass 10 or with an intermediate end plate disposed therebetween. A set of guide pins 30 is mounted to the push bar projecting away from and in the plane of the sheet of glass with their ends received within channels 34 of a block 36. A compression spring 32 is mounted about each of the guide pins between the push bar and block. An L-shaped end frame 38 is interlocked with lower cover plate 20 and slidably carries block 36 thereupon. The end frame is provided with a threaded channel 40 in which a threaded bolt 42 is received. Finally, an end frame cover plate 44 is placed atop the push bar and block and held to the end frame by fastener 45.

So constructed it may be seen that rotation of the threaded screw 42 serves to urge block 36 towards an end of the sheet of glass which in turn compresses springs 32. This action increases the force exerted by the springs upon push bar 26 which applies an in-plane compressive force upon sheet of glass 10 between push bar 26 and end piece 25. The amount of compressive in-plane force applied may be easily calibrated from the strength of the springs employed and the area of the end of the sheet of glass in abutment with the push bar.

Figure 4:
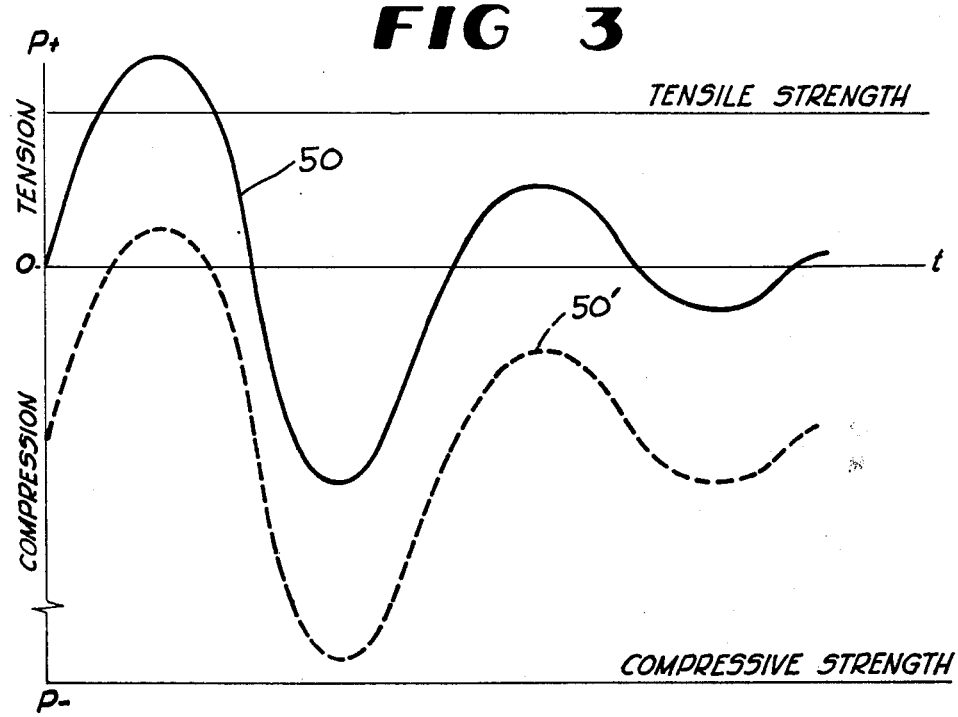
FIG. 4 is a force diagram of acoustic waves propagated within the acousto-optic waveguide shown in the other figures.

By placing the sheet of glass in in-plane compression, the glass is rendered substantially less likely to fracture under impact of acoustic waves generated by the transducer and propagated therethrough. This may be understood by reference to FIG. 4 wherein curve 50 represents the force applied by an acoustic pulse generated from the transducer and propagated through the glass in an uncompressed state, and curve 50' represents the force of the same acoustic pulse within the glass in a compressed state. With the glass uncompressed it is seen that an initial portion of curve 50 exceeds the tensile strength of the glass which may cause the glass to fracture. However, by applying an in-plane compressive force to this glass, and thus pressure biasing it, the oscillations in acoustic wave energy are effectively shifted downwardly whereupon the tensile strength of the glass is at no point exceeded. Since planar wafers of glass have substantially greater compressive strength than tensile strength, there is little danger of the biased pressure waves from reaching the compressive strength limits of the glass. The laminated structure previously described, which includes the resilient pad and cover plates, simultaneously applies compressive force to the sheet of glass in a direction normal its plane. This compressive force restrains the glass from buckling under the forces of the in-plane compression and acoustic waves applied which would tend to negate the effectiveness of the pressure bias.

It thus is seen that a ruggedized acousto-optic waveguide is provided of the type which employs a thin sheet of glass which is capable of handling relative high power without danger of structural failure. The device is simple in construction and easy to assemble and adjust. In operation acoustic waves can be propagated therethrough while a light beam 55 simultaneously scans an exposed side edge of the glass in the direction of arrows 56 as shown in FIG. 1 with the waveguide employed in a traveling lens. This embodiment of the invention should nevertheless be understood as merely illustrating principles of the invention in one preferred form. Many modifications, additions and deletions may, of course, be made thereto without departure from the spirit and scope of the invention as set forth in the following claims.

We claim:
1. A ruggedized acousto-optic waveguide comprising, in combination,
a sheet of glass positioned along a plane,
transducer means, acoustically coupled with said sheet of glass, for generating and propagating acoustic waves through said sheet of glass along said plane,
means for placing said sheet of glass in compression along said plane, and
means for inhibiting said sheet of glass from buckling from said plane by applying a compressive force to said glass normal to said plane.

2. A ruggedized acousto-optic waveguide in accordance with claim 1 wherein said transducer means includes means for generating and propagating acoustic waves through said sheet of glass of amplitude in excess of the tensile strength of said sheet of glass in an uncompressed condition but of amplitude less than the tensile strength of said sheet of glass in a compressed state by said in compression placing means.

3. A ruggedized acousto-optic waveguide in accordance with claim 1 wherein said sheet of glass is optically clear with opposite edges exposed to ambient light.

4. A ruggedized acousto-optic wave guide in accordance with claim 1 wherein said in compression placing means includes means for adjusting the magnitude of the compression.

5. A ruggedized acousto-optic waveguide comprising, in combination, a pair of inner plates; a sheet of glass sandwiched flush between said inner plates; transducer means acoustically coupled with said sheet of glass for generating and propagating acoustic waves through said glass along an elongated acoustic wave path; means for pressing said pair of inner plates against said sheet of glass to place said glass in compression transverse said acoustic wave path; and means for compressing said glass in the direction of said elongated acoustic wave path.

6. A ruggedized acousto-optic waveguide in accordance with claim 5 wherein each of said inner plates has an acoustic impedence different from that of said sheet of glass.

7. A ruggedized acousto-optic waveguide in accordance with claim 5 wherein each of said inner plates is plastic.

8. A ruggedized acousto-optic waveguide in accordance with claim 5 wherein said inner plates pressing means comprises a pair of metallic outer plates mounted about said pair of inner plates.

9. A ruggedized acousto-optic waveguide in accordance with claim 8 further comprising fastening means for holding said pair of outer plates together with said sheet of glass and said pair of inner plates sandwiched therebetween.

10. A ruggedized acousto-optic waveguide in accordance with claim 8 further comprising a resilient pad sandwiched between one of said inner plates and one of said outer plates.

11. A ruggedized acousto-optic waveguide in accordance with claim 10 wherein said resilient pad is composed of rubber.

12. A ruggedized acousto-optic waveguide in accordance with claim 5 wherein said glass compressing means comprises a set of compression springs biased against one end of said sheet of glass.

13. A ruggedized acousto-optic waveguide in accordance with claim 12 wherein said transducer means is acoustically coupled to an end of said sheet of glass opposite said one end.

14. A ruggedized acousto-optic waveguide comprising a pair of inner plastic plates; a sheet of optical glass sandwiched flush between said inner plates with side edges exposed to ambient light, a resilient pad overlaying one of said inner plates, a pair of cover plates mounted about and in compressive engagement with said pair of inner plates and resilient pad; a transducer acoustically coupled with one end of said sheet of glass; and at least one compression spring coupled with the other end of said sheet of glass applying in-plane compressive force to said sheet of glass.

15. A ruggedized acousto-optic waveguide in accordance with claim 14 further comprising a set of screws adjustably coupling together said pair of cover plates.

16. A ruggedized acousto-optic waveguide in accordance with claim 15 further comprising means for adjusting the force with which said compression spring is coupled with said other end of said sheet of glass.

17. A method of ruggedizing an acousto-optic waveguide of the type employing a thin sheet of optical glass in which a beam of light is directionally controlled by acoustic waves traversing the sheet of glass in a preselected direction, and with said method comprising the steps of placing said sheet of glass in compression in said preselected direction and applying a compressive force to the sheet of glass in a direction normal said preselected direction.

18. A method of ruggedizing an acousto-optic waveguide in accordance with claim 17 wherein the steps are simultaneously performed.

19. A method of ruggedizing an acousto-optic waveguide according to claim 17, wherein said sheet of glass is positioned along a plane, said preselected direction is parallel to said plane, and said normal direction is transverse to said plane.

* * * * *